Dec. 18, 1956 O. E. DOW 2,774,871

COUNTER OR STEP WAVE GENERATOR

Filed Sept. 18, 1952

INVENTOR.
ORVILLE E. DOW

BY Charles H. Brown
ATTORNEY

United States Patent Office 2,774,871
Patented Dec. 18, 1956

2,774,871

COUNTER OR STEP WAVE GENERATOR

Orville E. Dow, Port Jefferson, N. Y., assignor to Radio Corporation of America, a corporation of Delaware Application September 18, 1952, Serial No. 310,342

2 Claims. (Cl. 250—27)

This invention relates to an electrical counter circuit for generating a cyclic step wave.

An object of the invention is to provide an improved circuit for generating a step wave voltage having a plurality of steps or risers corresponding in number to a desired number of applied input waves.

Another object is to provide a stable counter circuit for generating a pulse wave which has a repetition rate which is a submultiple of the repetition rate of an applied pulse wave.

Counter circuits generally employ a step wave generator which adds an increment of charge on a capacitor every time a pulse is applied to the step wave generator. The voltage on the capacitor is coupled to a discharge tube normally biased to cut-off, and after a predetermined number of charge increments have been added to the capacitor, the voltage thereacross reaches a value which overcomes the bias on the discharge tube, allowing it to conduct and discharge the capacitor. The cycle is then repeated.

The bias on the discharge tube may be set to a value which is overcome by the full amplitude of the last riser or by less than the full amplitude of the last riser. It has been found that the counter is most stable and reliable in its count when the discharge tube is biased so that the bias is overcome when the last riser reaches about half its full amplitude, the full amplitude being the same as the amplitude of the other risers. If the bias is such as to be overcome by full amplitude of the last riser, slight variations in the circuit element may result in a failure on the part of the discharge tube to conduct after the last riser, and the step generator will then generate an additional step on the step wave. The count is then wrong.

Setting the bias on the discharge tube so that it is overcome when the last riser reaches one-half of full amplitude provides for stable and reliable operation as a counter. However, in many applications of counters, especially where the risers are employed to trigger other circuits, it is most important that the amplitudes of all risers, including the last riser, be equal. It is therefore a primary object of this invention to provide an improved, stable circuit for generating a step wave wherein the last riser has an amplitude substantially equal to that of the other risers.

According to a feature of the present invention, a portion of the pulse input is applied through a delay line to the electron discharge device or tube. The bias on the discharge tube is set to a value such that it can be overcome only by both the full amplitude of the last riser and a delayed input pulse. Recycling thus takes place at a time after the last riser reaches full amplitude, which time is determined by the delay of an input pulse by the delay line.

The counter circuit of the invention has numerous applications in electrical circuits. By way of illustration, the invention may be used in a pulse type time division multiplex communications system for producing a step wave voltage, the different steps or risers in the step wave voltage being used to control different channel selector circuits. The counter of the invention may also be used to produce an output pulse which has a submultiple frequency relation to an input wave.

A more detailed description of the invention follows in conjunction with the accompanying drawing, in which.

Figure 1:
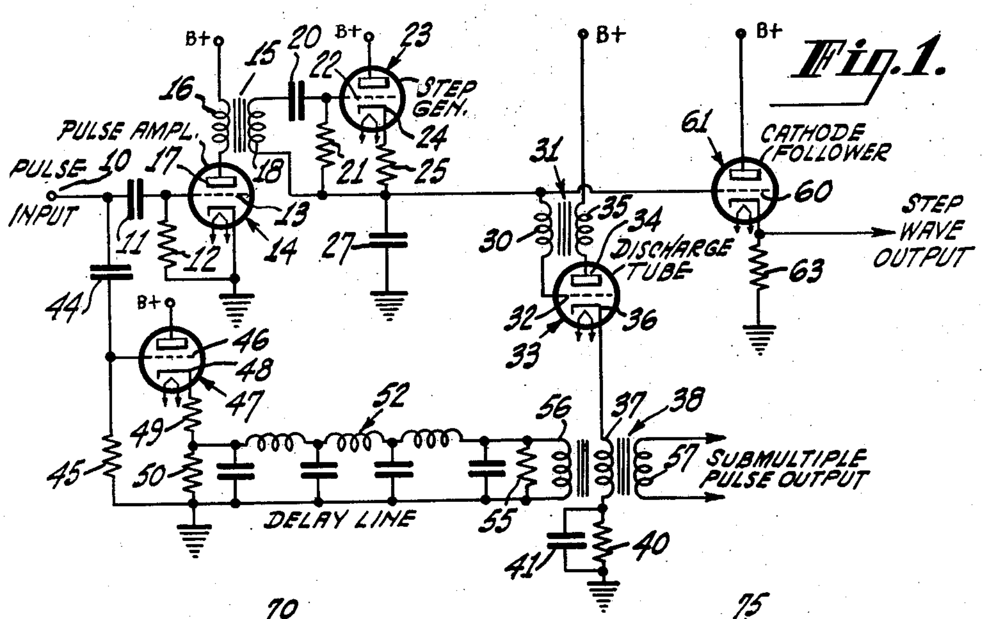
Fig. 1 is a circuit diagram of one embodiment of the invention.
Figure 3:
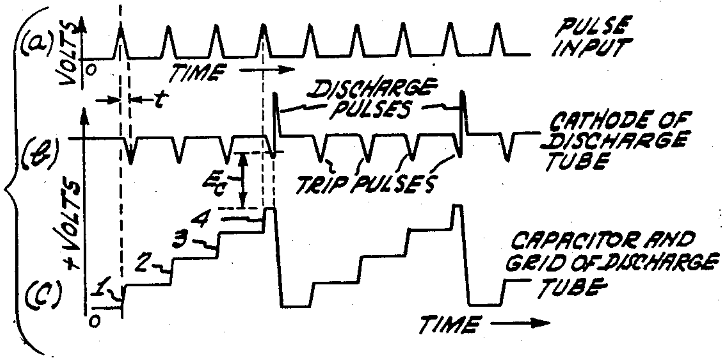
Fig. 3 shows a series of curves representing voltage variations at various points in the circuit.

A pulse input wave, which may be as represented in Figure 3*a*, is applied to input terminal 10 of Figure 1 from which it passes through coupling capacitor 11, across grid resistor 12, to the grid 13 of pulse amplifier vacuum tube or device 14. An output transformer 15 is connected with its primary coil 16 between the anode 17 of tube 14 and the positive terminal B+ of a source of unidirectional potential. An amplified pulse wave is derived from the secondary coil 18.

The amplified pulse wave is applied through coupling capacitor 20, across grid resistor 21, to the grid 22 of step wave generator vacuum tube or device 23. The cathode 24 is connected to a cathode resistor 25, and the common ends of resistors 21 and 25 are connected to a storage capacitor 27, one plate of which is returned to ground. The windings of transformer 15 are so poled that a positive pulse is developed across grid resistor 21 and each pulse is sufficient in amplitude to exceed the cut off potential of tube 23, causing electron current to flow in the grid circuit in response to a positive polarity input pulse applied to terminal 10. In the intervals between pulses, the charge on capacitor 20 develops the bias across grid resistor 21 which maintains tube 23 in a normally cut off condition. Each time a positive pulse is applied to grid 22, plate current flows adding an increment of charge on capacitor 27.

Cathode resistor 25 improves the linearity of the step wave, that is, it makes all the risers more nearly equal in amplitude. Normally, with each successive riser of a cycle, there is a reduction in the anode-to-cathode voltage on tube 23 due to the accumulation of charge on capacitor 27. Since the input pulses are all of equal amplitude, each successive pulse of a cycle results in a riser of less amplitude, i. e., a smaller increment of charge is placed on capacitor 27. Cathode resistor 25 partially counteracts this inequality because it is in the anode-to-cathode circuit and it has developed across it an opposing voltage which is less for each successive riser. This reduces the amplitude of the first risers much more than the last risers so that all risers are more nearly equal in amplitude.

Cathode resistor 25 serves another function. Some receiving type tubes are manufactured with a reducing agent in the nickel cathode sleeve to expedite activation of the cathode. This agent causes an increase in the internal cathode resistance after a few thousand hours of operation of the tube and the increase is accelerated if the emission from the cathode of the tube is cut off for a large percentage of the time of operation, as is the case with tube 23. This increase in internal cathode resistance causes a decrease in the step wave amplitude and may even result in a change in count unless adjustments are made from time to time. The insertion of resistor 25 in the circuit reduces the effect of the change in internal cathode resistance since the internal cathode resistance is then only a fraction of the total cathode resistance.

The voltage on storage capacitor 27 is coupled through the coil of a regenerative transformer 31 to the grid 32 of a discharge tube 33. The anode 34 is connected through the coil 35 of transformer 31 to B+. The cathode 36 is connected through a tertiary coil 37 of a transformer 38, and through a cathode resistor 40, having a by-pass capacitor 41, to ground.

Every time a pulse is applied to step generator tube 23, the tube conducts and adds a charge on storage capacitor 27. This results in steps of voltage, as shown in Figure 3*c*, being developed across capacitor 27 and the grid circuit of discharge tube 33. Tube 33 is normally biased below cut-off due to bias developed across its cathode resistor 40. When the step wave voltage on the grid 32 of discharge tube 33 overcomes the bias on its cathode 36, anode current starts to flow in the winding 35 of transformer 31. The windings of transformer 31 are so poled that an increase in current in coil 35 causes an increase in voltage across coil 30 such as to make the grid 32 of discharge tube 33 positive with respect to the high terminal of capacitor 27. The increased grid voltage further increases the plate current which, in turn, further increases the grid voltage. This action continues until the grid 32 of discharge tube 33 draws grid current. The grid current discharges storage capacitor 27. When grid current starts to flow in discharge tube 33, the rate of increase of the anode current decreases, which results in a decrease in grid voltage. The decrease in grid voltage further reacts on the anode current. This action continues until the discharge tube 33 cuts off.

As stated above, discharge tube 33 is normally biased below cut-off by cathode resistor 40, and the tube conducts when the step wave voltage on its grid 36 overcomes the bias on its cathode 36. According to the teachings of the present invention, the value of cathode resistor 40 is chosen to keep discharge tube 33 cut off after receipt of the last desired step or riser of the step wave. Discharge tube 33 is made to conduct at a time determined by the application of a trip pulse to the cathode 36 of the discharge tube 33.

Trip pulses are derived from the pulse input. The pulse input from terminal 10 is applied through a coupling capacitor 44 across a grid resistor 45 to the grid 46 of a cathode follower vacuum tube 47. The cathode 48 of tube 47 is connected through a voltage-divider load resistor 49, 50 to ground. Trip pulses of an amplitude determined by voltage divider 49, 50 are applied from resistor 50 to a delay line 52 consisting of series inductors and shunt capacitors. Resistor 50 has a value matching the characteristic impedance of the delay line 52 so that no reflections will occur at this end of the line. The other end of the line is connected to an impedance matching resistor 55 and a primary coil 56 of transformer 38. Transformer 38 also has a secondary coil 57 from which a submultiple output pulse may be obtained. The windings 56 and 37 of transformer 38 are poled so that positive delayed input pulses from delay line 52 are applied as negative trip pulses to cathode 36 of discharge tube 33.

Cathode follower 47 is cut off between pulses by the average grid current through grid resistor 45 so that the pulses at the cathode 48 applied to the delay line 52 are shorter than the input pulses. The delay line 52 and transformer 38 should have a high frequency response so as not to shorten the pulse voltages. Delay line 52 is preferably made to cause a delay of the pulses which is between one and two times the build-up time of the risers. The time delay of delay line 52 is represented by *t* in Figure 3.

The voltage on the cathode 36 of discharge tube 33 is as represented by the wave of Figure 3*b*, the negative trip pulses being derived from the input pulses (Fig. 3*a*), and the positive discharge pulses being the result of rendering the discharge tube 33 conductive. Wave Figure 3*c*, on the same voltage ordinate scale as wave Figure 3*b*, represents the voltage on storage capacitor 27 and grid 32 of discharge tube 33. A step wave with four risers is shown by way of example. It will be noted that the fourth riser of the step wave (Fig. 3*c*) is substantially equal in amplitude to the first three risers and that the discharge tube 33 does not conduct for a period of time following the fourth riser. The vertical distance between the wave of Figure 3*b* and the wave of Figure 3*c* represents the cathode-to-grid voltage of discharge tube 33 at any time. The cut-off potential $E_c$ of tube 33 is represented by a vertical arrow. It will be seen that the vertical distance between waves of Figures 3*b* and 3*c* is less than the cut-off potential $E_c$ at a time following each fourth riser determined by delay line 52. Tube 33 conducts only after the full amplitude of the fourth riser on its grid 32 has been reached and then only upon the simultaneous receipt at the cathode of a trip pulse. By this construction the counter or step generator operates in a most stable and reliable manner and yet the last riser of the step wave has an amplitude substantially equal to that of the other three.

The discharge pulses on the cathode 36 of tube 33 are available as a submultiple pulse output from the secondary 57 of transformer 38. The trip pulses, being of opposite polarity from the discharge pulses, do not pose any serious problem in the utilization of the discharge pulses as a source of submultiple pulses. The discharge pulses are, of course, delayed in time relative to the input pulses as a result of the delay in delay line 52.

The step wave voltage on storage capacitor 27 is taken out to the grid 60 of a cathode follower 61. A step wave output conforming with the wave of Figure 3*c* is obtained from across the cathode load resistor 63.

Figure 2:
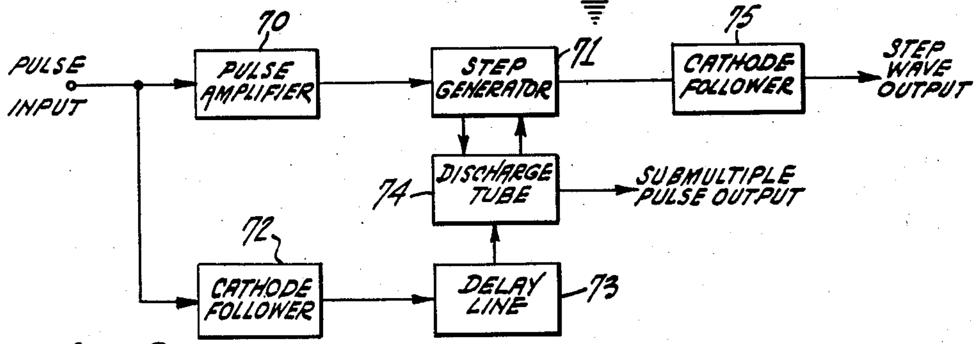
Fig. 2 is a block diagram corresponding to the circuit of Figure 1.

Fig. 2 is a functional block diagram of the circuit shown in Figure 1. The pulse input is applied through a pulse amplifier 70 to a step generator 71, and also through a cathode follower 72 and a delay line 73. A discharge tube circuit 74 is responsive to the total amplitude of the step wave in step generator 71 and a delayed pulse from delay line 73. When the discharge tube 74 fires, the step generator 71 is recycled and a submultiple pulse is generated. The step wave output is obtained from the step generator 71 by means of a cathode follower 75.

What is claimed is:

1. A step wave generator receptive to a pulse input, comprising: an amplifier for said pulse input, a storage device, a first electron discharge device receptive to the pulse input and operative to add an increment of charge to the storage device for every pulse received, a cathode follower also receptive to said pulse input, a delay line receptive to the output of said cathode follower, a second electron discharge device coupled to said storage device and biased by the voltage on the storage device and the delayed pulses from the delay line so that the second electron discharge device is rendered conductive to discharge the storage device at predetermined intervals, and a cathode follower coupled to the storage device for providing a step wave output.

2. The combination of claim 1 and in addition means coupled to said second electron discharge device for providing a submultiple pulse output.

References Cited in the file of this patent

UNITED STATES PATENTS

| | | |
|---|---|---|
| 2,221,666 | Wilson | Nov. 13, 1940 |
| 2,540,524 | Houghton | Feb. 6, 1951 |
| 2,588,413 | Roschke | Mar. 11, 1952 |
| 2,592,493 | Trevor | Apr. 8, 1952 |